United States Patent
Shi et al.

(10) Patent No.: US 9,878,934 B2
(45) Date of Patent: Jan. 30, 2018

(54) METHODS AND APPARATUS FOR CONVEYING A GLASS RIBBON

(71) Applicant: Corning Incorporated, Corning, NY (US)

(72) Inventors: Zhiqiang Shi, Shrewsbury, MA (US); Ningli Yang, Unionville, CT (US); Rui Zhang, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/888,527

(22) PCT Filed: Apr. 30, 2014

(86) PCT No.: PCT/US2014/036097
§ 371 (c)(1),
(2) Date: Nov. 2, 2015

(87) PCT Pub. No.: WO2014/179422
PCT Pub. Date: Nov. 6, 2014

(65) Prior Publication Data
US 2016/0075589 A1    Mar. 17, 2016

Related U.S. Application Data

(60) Provisional application No. 61/819,223, filed on May 3, 2013.

(51) Int. Cl.
*C03B 33/023* (2006.01)
*B65H 23/24* (2006.01)
(Continued)

(52) U.S. Cl.
CPC ......... *C03B 33/0235* (2013.01); *B65H 23/24* (2013.01); *B65H 51/16* (2013.01);
(Continued)

(58) Field of Classification Search
CPC . C03B 33/0235; C03B 33/037; C03B 33/091; C03B 35/14; C03B 35/142;
(Continued)

(56) References Cited

U.S. PATENT DOCUMENTS 4,743,284 A   5/1988  Mouly et al.
6,119,052 A   9/2000  Guenther et al.
(Continued)

FOREIGN PATENT DOCUMENTS

CN    102445494 A      5/2012
JP    2010157612 A  *  7/2010
(Continued)

OTHER PUBLICATIONS

Yokohama M, Conveyor apparatus for levitatingly conveying substrate such as glass substrate, has sensors which are arranged to detect sound wave or vibration by contact with substrate and floating unit, JP2010157612, Jul. 2010, machine translation.*
(Continued)

*Primary Examiner* — Queenie S Dehghan
(74) *Attorney, Agent, or Firm* — Jeffrey A. Schmidt

(57) ABSTRACT

Methods of conveying a glass ribbon are provided that each includes the step of conveying the glass ribbon over a support device with a cushion of fluid supporting the glass ribbon over the support device. Each method further includes the step of monitoring a physical contact event between the glass ribbon and the support device by detecting an acoustic signal associated with the physical contact event. In further examples, glass ribbon conveying apparatus are provided that each includes a support device configured to support a glass ribbon over the support device with a cushion of fluid. Each apparatus further includes an acoustic sensor configured to monitor a physical contact event between the
(Continued)

glass ribbon and the support device by detecting an acoustic signal associated with the physical contact event.

17 Claims, 5 Drawing Sheets

(51) Int. Cl.
    *C03B 33/09*     (2006.01)
    *B65H 51/16*     (2006.01)
    *B65H 51/32*     (2006.01)
    *B65H 57/00*     (2006.01)
    *B65H 61/00*     (2006.01)
    *B65H 63/08*     (2006.01)
    *C03B 33/037*     (2006.01)
    *B65G 49/06*     (2006.01)

(52) U.S. Cl.
    CPC ............. *B65H 51/32* (2013.01); *B65H 57/00* (2013.01); *B65H 61/00* (2013.01); *B65H 63/08* (2013.01); *C03B 33/037* (2013.01); *C03B 33/091* (2013.01); *B65G 49/065* (2013.01); *B65H 2301/4148* (2013.01); *B65H 2406/13* (2013.01); *B65H 2406/14* (2013.01); *B65H 2406/365* (2013.01); *B65H 2515/50* (2013.01); *B65H 2553/30* (2013.01); *B65H 2801/61* (2013.01)

(58) Field of Classification Search
    CPC . C03B 35/145; C03B 35/147; B65H 2515/50; B65H 63/08
    See application file for complete search history.

(56) References Cited

U.S. PATENT DOCUMENTS

| | | |
|---|---|---|
| 7,260,959 B2 | 8/2007 | Chang et al. |
| 2006/0042314 A1 | 3/2006 | Abbott, III et al. |
| 2011/0094267 A1 | 4/2011 | Aniolek et al. |
| 2011/0277507 A1 | 11/2011 | Lu et al. |
| 2012/0111054 A1 | 5/2012 | Blanding et al. |
| 2012/0247154 A1 | 10/2012 | Abramov et al. |

FOREIGN PATENT DOCUMENTS

| | | |
|---|---|---|
| JP | 2011200990 A | 10/2011 |
| JP | 2012142517 A | 7/2012 |
| JP | 2013207106 A | 10/2013 |
| TW | 201202115 A | 1/2012 |
| WO | 2010067732 A1 | 6/2010 |
| WO | 2013025741 A1 | 2/2013 |

OTHER PUBLICATIONS

English Translation of JP2016511828 Office Action dated Apr. 18, 2017; 3 pages; Japanese Patent Office.

Search Report for Taiwan Invention Patent Application No. 103115730; dated Jul. 20, 2017; 1 page; Taiwan Patent Office.

English Translation of CN201480038006.6 First Office Action dated May 3, 2017; 10 pages; Chinese Patent Office.

* cited by examiner

METHODS AND APPARATUS FOR CONVEYING A GLASS RIBBON

CROSS-REFERENCE TO RELATED APPLICATIONS

This application claims the benefit of priority under 35 U.S.C. § 371 of International Patent Application Serial No. PCT/US14/36097, filed on Apr. 30, 2014, which in turn, claims the benefit of priority of U.S. Provisional Patent Application Ser. No. 61/819,223, filed on May 3, 2013, the contents of each of which are relied upon and incorporated herein by reference in their entireties.

TECHNICAL FIELD

The present disclosure relates to methods and apparatus for conveying a glass ribbon and, more particularly, to conveying apparatus for conveying a glass ribbon in a non-contact manner, and also to methods for conveying a glass ribbon in a manner so as to avoid contact between the glass ribbon and a support device.

BACKGROUND

Glass manufacturing apparatus are commonly used to form various glass products for example sheet glass for liquid crystal displays (LCDs), electrophoretic displays (EPD), organic light emitting diode displays (OLEDs), plasma display panels (PDPs), or other display applications. It is known to manufacture sheet glass by downwardly flowing molten glass over a forming wedge and using edge rollers to engage beads formed at opposite edge portions of a glass ribbon. One or more air bars are commonly used to support the glass ribbon as it traverses along a horizontal path. The air bar creates a cushion of air that facilitates support of the ribbon while avoiding physical contact with the air bar. As such, the pristine surfaces of the glass ribbon may be preserved since the air bar can ideally support the glass ribbon without contacting the glass ribbon. Even with the use of air bars, some procedures may frequently result in limited contact in an otherwise contactless support method. For instance, a coolant jet in a ribbon-severing procedure may consequently form a dimple in the glass surface that results in physical contact with the air bar. During such physical contact events, there is a desire to control the physical contact to avoid or minimize localized damage to the glass ribbon. There is also a desire to detect contact events in an effort to access consequent glass damage and/or modify the process to avoid future damage to the glass.

What is needed is and cost effective way to help detect physical contact events to enhance glass ribbon quality.

SUMMARY

In a first example aspect, a method of conveying a glass ribbon comprises a step (I) of conveying the glass ribbon over a support device with a cushion of fluid supporting the glass ribbon over the support device. The method further includes a step (II) of monitoring a physical contact event between the glass ribbon and the support device by detecting an acoustic signal associated with the physical contact event.

In one example of the first aspect, the method further comprises the step of severing the glass ribbon, wherein the physical contact event of step (II) comprises a touch down event of the glass ribbon physically contacting the support device during the step of severing the glass ribbon. For example, after step (II), the method can further comprise a step (III) of modifying the method of conveying the glass ribbon with feedback from the detected acoustic signal. For example, step (III) can modify the method of conveying the glass ribbon to provide a more consistent touch down event during a subsequent step of severing the glass ribbon. In another example, step (III) can modify the method of conveying the glass ribbon to provide a more stable touch down event during a subsequent step of severing the glass ribbon.

In another example of the first aspect, after step (II), the method can further comprise the step (III) of modifying the method of conveying the glass ribbon with feedback from the detected acoustic signal.

In still another example of the first aspect, step (II) detects the acoustic signal as an acoustic signal propagating through the glass ribbon.

In yet another example of the first aspect, step (II) detects the acoustic signal as an acoustic signal propagating through the support device.

In a further example of the first aspect, step (I) provides the support device as a fluid bar generating the cushion of fluid.

In another example of the first aspect, step (I) provides the cushion of fluid as a cushion of air.

In yet another example of the first aspect, the method further includes the step (III) of storing process features of the method of conveying the glass ribbon associated with a time of the physical contact event. In one example, the method further includes the step (IV) of controlling the method of conveying the glass ribbon based on process features stored during step (III).

In still another example of the first aspect, the method further comprises the step of determining features of the physical contact event by analyzing the acoustic signal detected during step (II).

The first example aspect discussed above may be carried out alone or in combination with any example or any combination of examples of the first aspect discussed above.

In a second example aspect, a glass ribbon conveying apparatus comprises a support device configured to support a glass ribbon over the support device with a cushion of fluid. The apparatus further includes an acoustic sensor configured to monitor a physical contact event between the glass ribbon and the support device by detecting an acoustic signal associated with the physical contact event.

In one example of the second aspect, the apparatus further comprises a controller configured to modify operation of the glass ribbon conveying apparatus based on an acoustic signal detected by the acoustic sensor.

In another example of the second aspect, the apparatus further comprises a storage device configured to store process features of the conveying apparatus associated with a time of the physical contact event. For example, the apparatus can further comprise a controller configured to modify operation of the glass ribbon conveying apparatus based on stored process features within the storage device.

In one example of the second aspect, the acoustic sensor is mounted to the support device to detect an acoustic signal passing through the support device.

In another example of the second aspect, the acoustic sensor is configured to monitor the glass ribbon to detect an acoustic signal passing through the glass ribbon.

In still another example of the second aspect, the support device comprises a fluid bar configured to generate the cushion of fluid.

The second example aspect discussed above may be carried out alone or in combination with any example or any combination of examples of the second aspect discussed above.

BRIEF DESCRIPTION OF THE DRAWINGS

These and other aspects are better understood when the following detailed description is read with reference to the accompanying drawings, in which.

DETAILED DESCRIPTION

Figure 1:
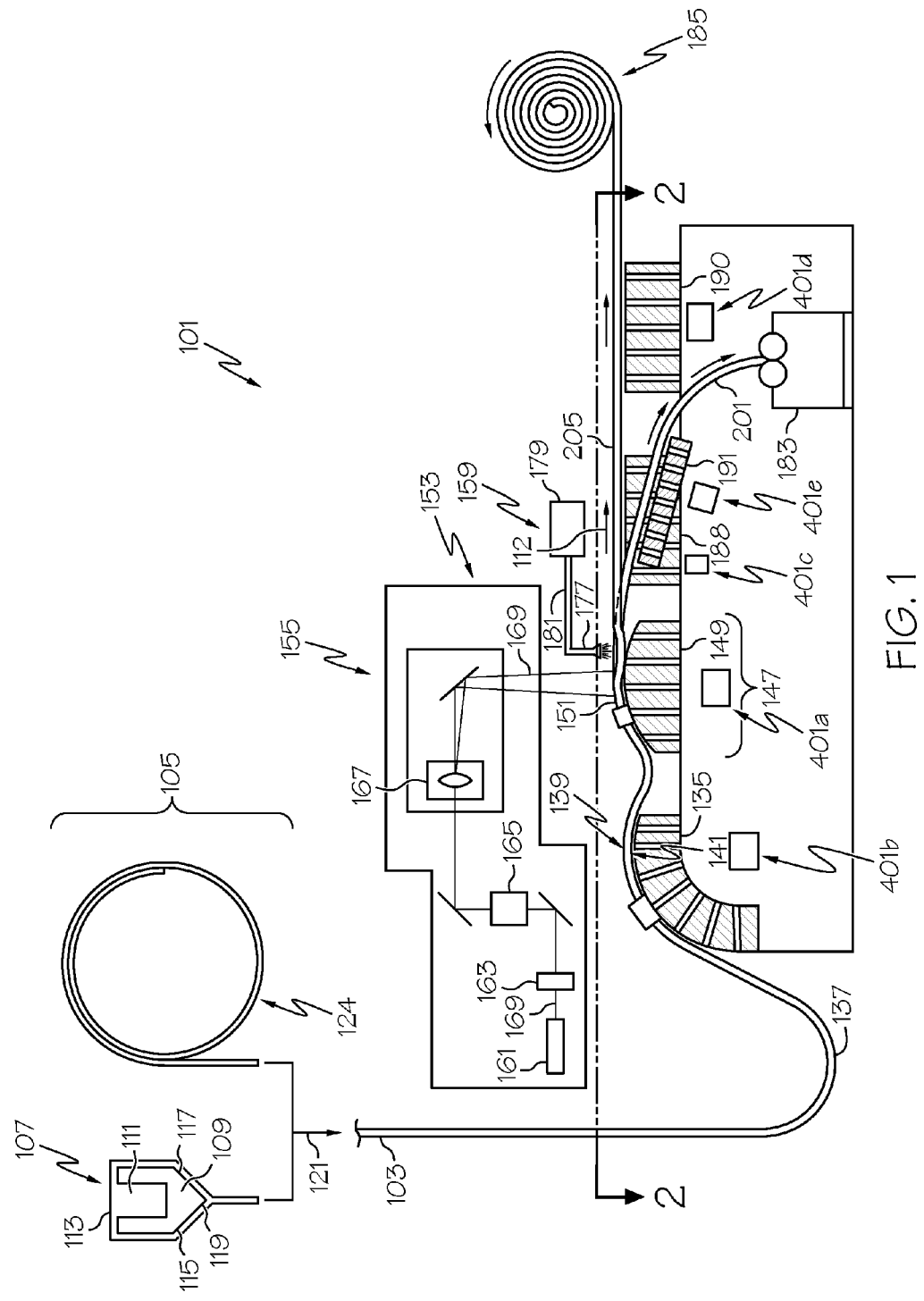
FIG. 1 illustrates a schematic view of an example apparatus for fabricating a glass ribbon.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Methods and apparatus for conveying a glass ribbon are provided. Such methods can be provided in an apparatus for fabricating the flexible glass ribbon that may be subsequently processed into glass sheets that may be incorporated into liquid crystal displays (LCDs), electrophoretic displays (EPD), organic light emitting diode displays (OLEDs), plasma display panels (PDPs), or other applications.

FIG. 1 illustrates an apparatus 101 for fabricating a flexible glass ribbon 103. The glass ribbon 103 can be provided by a wide range of glass ribbon sources. FIG. 1 illustrates two example sources 105 of glass ribbon 103 although other sources may be provided in further examples. For instance, as shown in FIG. 1, the source 105 of glass ribbon 103 can comprise a down draw glass forming apparatus 107. As schematically shown, the down draw glass forming apparatus 107 can include a forming wedge 109 at the bottom of a trough 111. In operation, molten glass 113 can overflow the trough 111 and flow down opposite sides 115, 117 of the forming wedge 109. The two sheets of molten glass are subsequently fused together as they are drawn off the root 119 of the forming wedge 109. As such, the glass ribbon 103 may be fusion down drawn to traverse in a downward direction 121 off the root 119 of the forming wedge 109. Other down draw forming methods for the glass ribbon source 105 such a fusion, up-draw, float, press rolling, slot draw, redraw or other forming methods. Regardless of the source or method of production, the glass ribbon 103 can possibly have a thickness of ≤500 microns, ≤300 microns, ≤200 microns, or ≤100 microns. The glass ribbon 103 can possibly have a width of ≥20 mm, ≥50 mm, ≥100 mm, ≥500 mm, or ≥1000 mm. The glass ribbon 103 can possibly have a variety of compositions including but not limited to soda-lime, borosilicate, alumino-borosilicate, alkali-containing, alkali-free. The glass ribbon 103 can possibly have a coefficient of thermal expansion of ≤15 ppm/° C., ≤10 ppm/° C., or ≤5 ppm/° C. The glass ribbon 103 can have various speeds as it traverses along travel direction 112.

Figure 2:
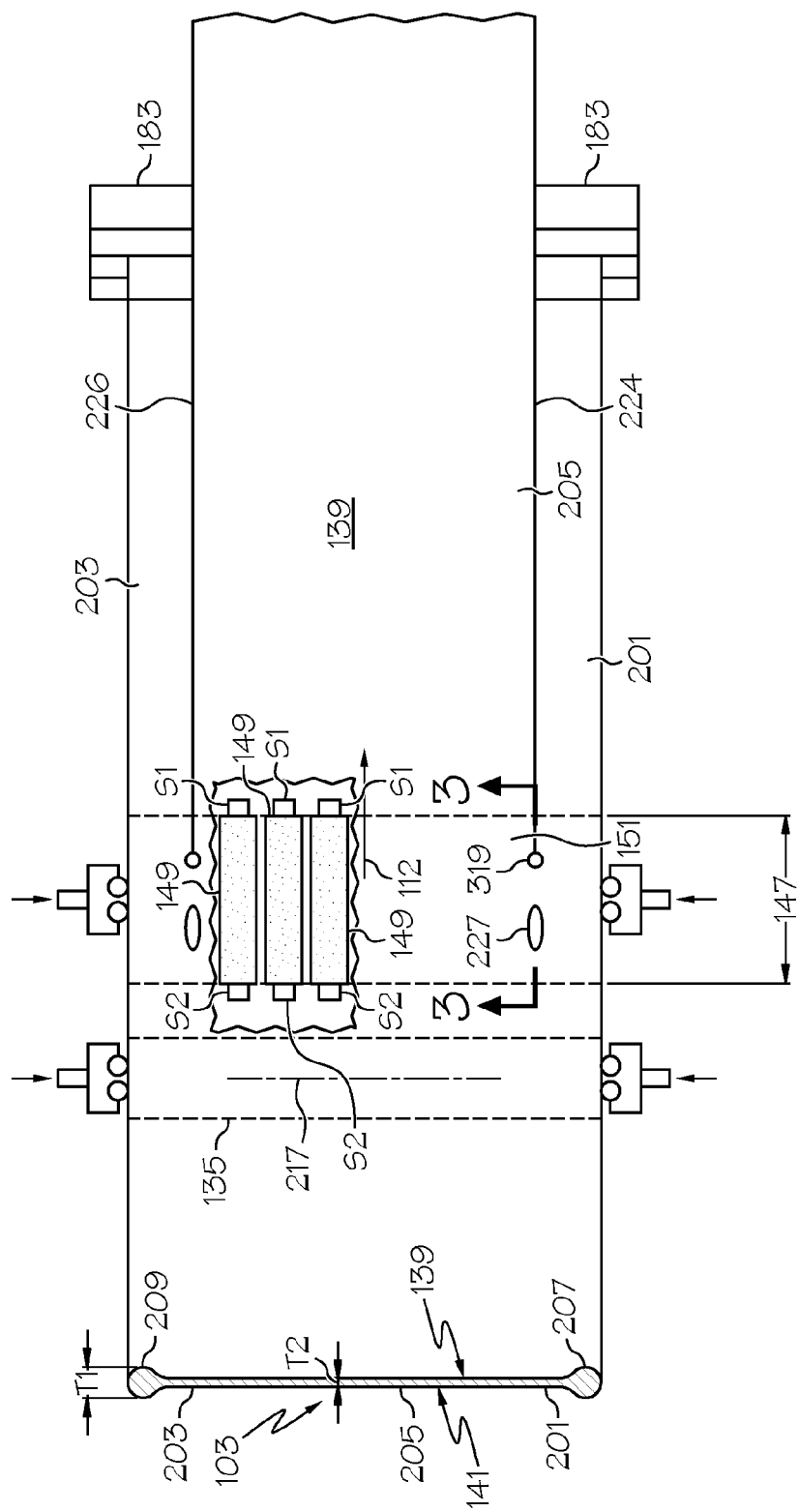
FIG. 2 is a sectional view of the apparatus along line 2-2 of FIG. 1.

As shown by the cross section of FIG. 2, the glass ribbon 103 can include a pair of opposed edge portions 201, 203 and a central portion 205 spanning between the opposed edge portions 201, 203. Due to the down draw fusion process, the edge portions 201, 203 of the glass ribbon may have corresponding beads 207, 209 with a thickness "T1" that is greater than a thickness "T2" defined between opposite faces 139, 141 of the central portion 205 of the glass ribbon 103. The apparatus 101 can be designed to process glass ribbons 103 with a thin central portion 205, for example glass ribbons with a thickness "T2" in a range of from about 20 microns to about 300 microns, for example from about 50 microns to about 300 microns, for example from about 85 microns to about 150 microns although glass ribbons with other thicknesses may be processed in further examples.

Turning back to FIG. 1, another example source 105 of glass ribbon 103 can comprise a coiled spool 124 of glass ribbon 103. For example, glass ribbon 103 may be wound into the coiled spool 124 after being drawn into a glass ribbon, for example, with the down draw glass forming apparatus 107. If the source 105 comprises the coiled spool 124, the glass ribbon 103 may be uncoiled from the coiled spool 124 of glass ribbon 103 to traverse the glass ribbon 103 in the downward direction 121.

The apparatus 101 can further include an optional bending support device 135 configured to support the glass ribbon 103 over the bending support device 135 with a cushion of fluid. For instance, the optional bending support device 135 can be provided in examples where the elevation of a lower portion 137 of the glass ribbon is lower than a lateral travel elevation of the glass ribbon passing through support portions leading to a cutting zone 147. The bending support device 135, if provided, can be designed to help inhibit, for example prevent, the supported face 141 of the glass ribbon 103 from touching the bending support device 135.

The apparatus can further include a cutting zone 147 that may be provided with a cutting support device 149. As shown, the cutting support device 149 can optionally be configured to bend the glass ribbon 103 in the cutting zone 147 to provide a bent target segment 151 with a bent orientation in the cutting zone 147. Bending the target segment 151 within the cutting zone 147 can help stabilize the glass ribbon 103 during the cutting procedure. Such stabilization can help prevent buckling or disturbing the glass ribbon profile during the procedure of severing at least one of the opposed edge portions 201, 203 from the central portion 205 of the glass ribbon 103. In some examples, the cutting zone can produce an edge quality that possibly enables the central portion 205 to be bent at a radius of ≤500 mm, ≤300 mm, ≤200 mm, ≤100 mm, or ≤50 mm.

A cutting support device 149, if provided, can be designed to help inhibit, for example prevent, the supported face 141 of the glass ribbon 103 from touching the cutting support device 149. Moreover, the cutting support device 149 can provide a bent target segment 151 in the cutting zone 147 can also increase the rigidity of the glass ribbon 103 throughout the cutting zone 147. Increasing the rigidity of the glass ribbon 103 throughout the cutting zone 147 can help reduce changes in orientation due to natural shape variation of the incoming ribbon 103 which can produce undesirable variation in the cutting process. Increasing the rigidity of the glass ribbon 103 throughout the cutting zone 147 can also reduce the impact of mechanical perturbations and vibrations on the cutting process.

As set forth above, providing the bent target segment 151 in a bent orientation within the cutting zone 147 can help stabilize the glass ribbon 103 during the cutting procedure. Such stabilization can help prevent buckling or disturbing the glass ribbon profile during the procedure of severing at least one of the opposed edge portions 201, 203. Moreover, the bent orientation of the bent target segment 151 can increase the rigidity of the target segment to allow optional fine tune adjustment of the lateral orientation of the bent target segment 151. As such, relatively thin glass ribbons 103 can be effectively stabilized and properly laterally oriented without contacting the pristine opposed faces 139, 141 of the central portion 205 of the glass ribbon 103 during the procedure of severing at least one of the opposed edge portions 201, 203 from the central portion 205 of the glass ribbon 103.

Figure 3:
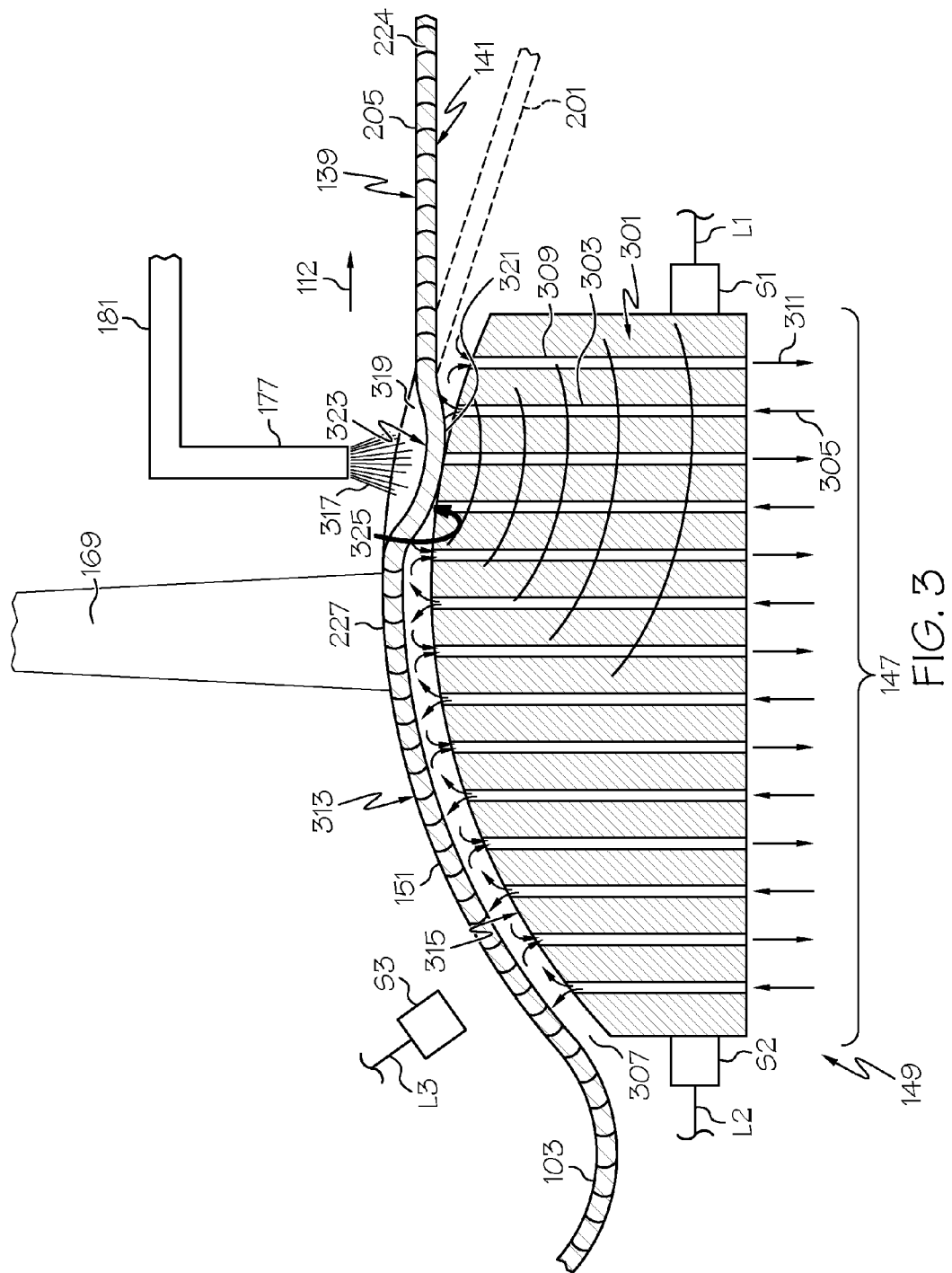
FIG. 3 is a sectional view of the apparatus along line 3-3 of FIG. 2, illustrating an example cutting support device with an upwardly facing convex support surface.

Increased stabilization and rigidity of the bent target segment 151 of the glass ribbon 103 can be achieved by bending the target segment to include an upwardly convex surface and/or an upwardly concave surface along a direction of the axis 217 transverse to the travel direction 112. For example, as shown in FIG. 3, the bent target segment 151 includes a bent orientation with an upwardly facing convex surface 313. Examples of the disclosure can involve supporting the bent target segment 151 with an upwardly facing convex support surface 315 of the cutting support device 149. As further shown in FIG. 3, providing the cutting support device 149 with an upwardly facing convex support surface 315 can likewise bend the glass ribbon 103 in the cutting zone 147 to achieve the illustrated bent orientation with the upwardly facing convex surface 313.

The apparatus 101 can further include a wide range of cutting devices configured to sever the edge portions 201, 203 from the central portion 205 of the glass ribbon 103. In one example, as shown in FIG. 1, one example glass cutting device 153 can include an optical delivery apparatus 155 for irradiating and therefore heating a portion of the upwardly facing surface of the bent target segment 151. In one example, optical delivery apparatus 155 can comprise a radiation source for example the illustrated $CO_2$ laser 161 although other laser types or other radiation sources may be provided in further examples. The optical delivery apparatus 155 can further include a circular polarizer 163, a beam expander 165, and a beam shaping apparatus 167. The laser 161 may be configured to initially emit the laser beam 169 with a substantially circular cross section (i.e. the cross section of the laser beam at right angles to the longitudinal axis of the laser beam). The optical delivery apparatus 155 can be operable to transform laser beam 169 such that the beam has a significantly elongated shape when incident on glass ribbon 103. As shown in FIG. 2, the elongated shape can produce an elongated radiation zone 227 that may include the illustrated elliptical footprint although other configurations may be provided in further examples. The elliptical foot print can be positioned on the upwardly facing convex surface 313 or concave surface (not shown) of the bent target segment 151. The elongated radiation zone 227 can heat through the entire thickness of the glass ribbon 103.

As further shown in FIG. 1, the example glass cutting device 153 can also include a coolant fluid delivery apparatus 159 configured to cool the heated portion of the upwardly facing surface of the bent target segment 151. The coolant fluid delivery apparatus 159 can comprise a coolant nozzle 177, a coolant source 179 and an associated conduit 181 that may convey coolant to the coolant nozzle 177. As shown in FIG. 1, the forced fluid cooling can occur on the same face 139 of the glass ribbon 103 as the incident heating source.

With reference to FIG. 3, the coolant nozzle 177 can be configured to deliver a coolant jet 317 of coolant fluid to the upwardly facing surface 313 of the bent target segment 151. The coolant nozzle 177 can have various internal diameters to form a cooling zone 319 of a desired size. As with elongated radiation zone 227, the diameter of coolant nozzle 177, and the subsequent diameter of coolant jet 317, may be varied as needed for the particular process conditions. In some embodiments, the area of the glass ribbon immediately impinged upon by the coolant (cooling zone) can have a diameter shorter than the minor axis of the radiation zone 227. However, in certain other embodiments, the diameter of the cooling zone may be larger than the minor axis of elongated radiation zone 227 based on process conditions for example speed, glass thickness, laser power, etc. Indeed, the (cross sectional) shape of the coolant jet may be other than circular, and may, for example, have a fan shape such that the cooling zone forms a line rather than a circular spot on the surface of the glass ribbon. A line-shaped cooling zone may be oriented, for example, perpendicular to the major axis of elongated radiation zone 227. Other shapes may be beneficial.

In one example, the coolant jet 317 comprises water, but may be any suitable cooling fluid (e.g., liquid jet, fluid jet or a combination thereof) that does not stain or damage the upwardly facing surface 313 of the bent target segment 151 of the glass ribbon 103. The coolant jet 317 can be delivered to a surface of the glass ribbon 103 to form the cooling zone 319. As shown, the cooling zone 319 can trail behind the elongated radiation zone 227 to propagate an initial defect formed by aspects of the disclosure described more fully below.

The combination of heating and cooling with the laser apparatus 155 and the cooling apparatus 159 can effectively sever the edge portions 201, 203 from the central portion 205 while minimizing or eliminating undesired residual stress, microcracks or other irregularities in the opposed edges 224, 226 of the central portion 205 that may be formed by other severing techniques. Moreover, due to the bent orientation of the bent target segment 151 within the cutting zone 147, the glass ribbon 103 can be properly positioned and stabilized to facilitate precise severing of the opposed edges 224, 226 during the severing process. Still further, due to the convex surface topography of the upwardly facing convex support surface 315 the edge portions (e.g., see 201 in broken lines in FIG. 3) can immediately travel away from the central portion 205, thereby reducing the probability that the edge portions will subsequently engage (and therefore damage) the pristine faces 139, 141 and/or the high quality opposed edges 224, 226 of the central portion 205.

Turning back to FIG. 1, the apparatus 101 may include structures configured to further process the severed edge portions 201, 203 and/or the central portion 205 of the glass ribbon 103 downstream from the cutting zone 147. For example, one or more glass ribbon choppers 183 may be provided to chop, shred, break or otherwise compact the trim segments for disposal or recycling.

The central portion 205 of the glass ribbon 103 can be further processed by cutting into glass sheets for incorporation into optical components. For example, the apparatus 101 may include another severing device (not shown) configured to sever the central portion 205 of the glass ribbon 103 along the axis 217 transverse to the travel direction 112 of the glass ribbon 103. Alternatively, as shown in FIG. 1, the central portion 205 of the glass ribbon 103 can be coiled into a coiled spool 185 for later processing. As shown, removing the edge portions 201, 203 consequently removes the corresponding beads 207, 209. Removing the beads reduces the minimum bend radius to allow the central portion 205 of the glass ribbon 103 to be more efficiently wound into a coiled spool 185.

Still further shown in FIG. 1, the apparatus 101 may also include one or more optional post-cutting support devices to guide at least the central portion 205 of the glass ribbon 103 downstream from the cutting zone 147. Such post-cutting support device(s), if provided, can be designed to help inhibit, for example prevent, the supported face 141 of the glass ribbon 103 from touching the post-cutting support device(s). For example, as shown, the apparatus can include a first post-cutting support device 188 and a second post-cutting support device 190 to guide the central portion 205 the glass ribbon for final processing. Two support devices are illustrated although a single support device or more than two support devices may be provided in further examples. As further shown, an optional edge portion support device 191 can also be provided to allow the severed edge portion to be guided to the glass ribbon chopper. If provided, the edge portion support device can be designed to help inhibit, for example prevent, the facing surface of the edge portion from touching the edge portion support device. As such, the optional edge portion support device 191 can reduce binding and/or restricted movement as the edge portion proceeds to the glass ribbon choppers 183.

As discussed above, the apparatus 101 can include one or more support devices that are designed to help inhibit, for example prevent, the supported face 141 of the glass ribbon 103 from touching corresponding support device. In one example, the support device can comprise a fluid bar (e.g., air bar) configured to generate a fluid cushion (e.g., air cushion) to help inhibit the support face 141 of the glass ribbon from touching the fluid bar. For example, example support devices can comprise one or more of the air bars as illustrated by the bending support device 135, cutting support device 149, post-cutting support device(s) 188, 190, edge portion support device 191 or other support devices configured to help inhibit, for example prevent, the supported face 141 of the glass ribbon 103 from touching the corresponding support device. Any of the support devices of the apparatus 101 can be incorporated as part of a glass ribbon conveying apparatus in accordance with aspects of the disclosure. Moreover, various glass ribbon conveying apparatus may be used in other processes for supporting a glass ribbon over a support device with a cushion of fluid.

Figure 4:
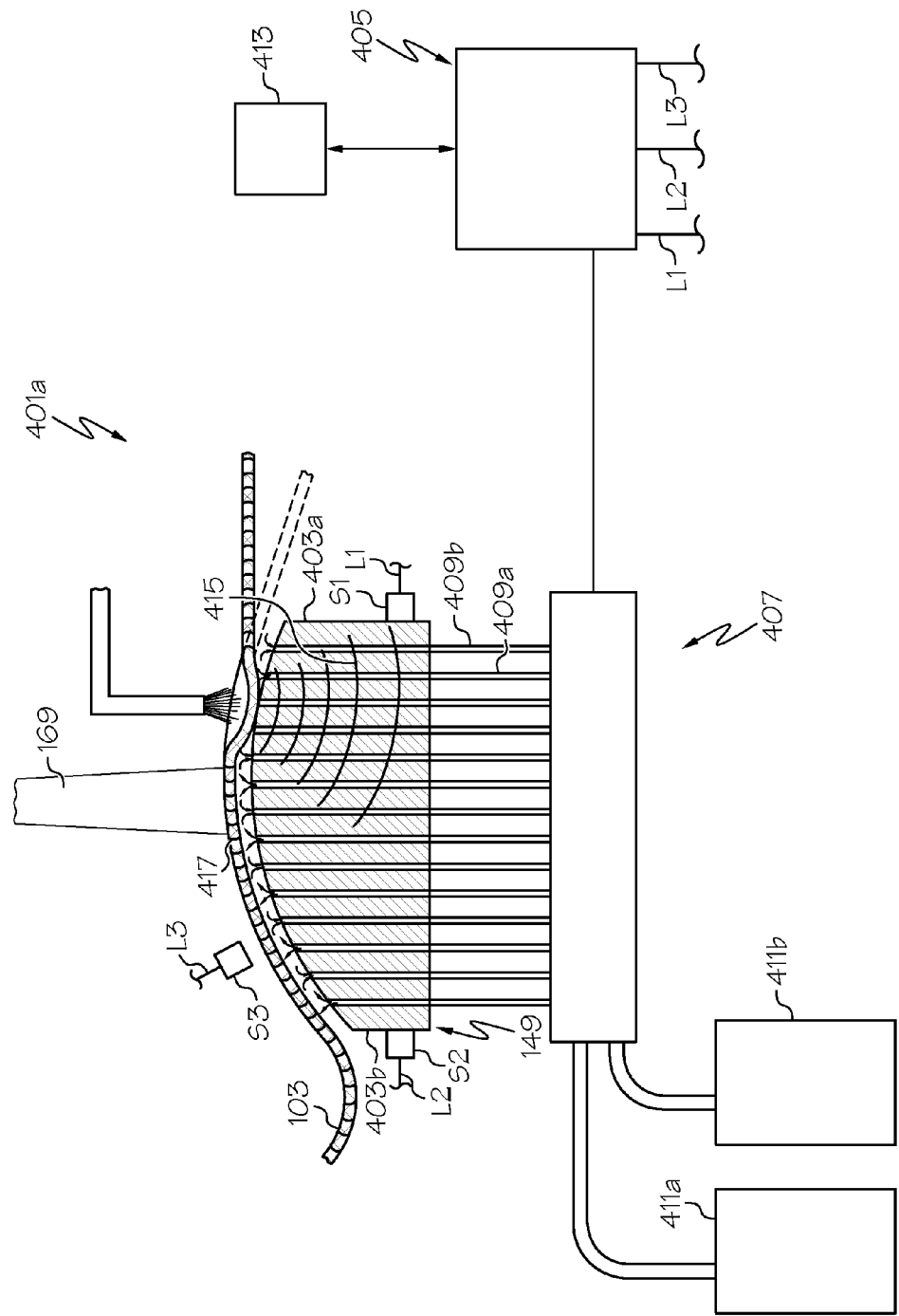
FIG. 4 is a schematic illustration of the apparatus of FIG. 3 and showing an glass ribbon conveying apparatus of the apparatus for fabricating the glass ribbon.

By way of example, FIGS. 3 and 4 provide a schematic illustration of a glass ribbon conveying apparatus 401a incorporating the cutting support device 149. In addition or alternatively, as schematically illustrated in FIG. 1, the apparatus 101 can also include one or more additional glass ribbon conveying apparatus 401b-e that likewise incorporate the bending support device 135, the post-cutting support devices 188, 190 and the edge portion support device 191, respectively.

Aspects of one example glass ribbon conveying apparatus 401a will now be described with the understanding that other glass ribbon conveying apparatus (e.g., 401b-e) may likewise contain identical or similar aspects. The support devices of aspects of the disclosure are configured to support a glass ribbon over the support device with a cushion of fluid. For example, FIG. 3 illustrates a cutting support device 149 configured to support the glass ribbon 103 over the cutting support device 149 with a cushion of fluid. A wide range of fluids can be used for example gas, liquid or vapor.

As shown, the cutting support device 149 can support the glass ribbon 103 over the support device 149 with a cushion 307 of gas, for example air or other gas. Although not shown, the gas may be filtered to help maintain the pristine surface of the glass ribbon 103. For example, although not shown, the glass ribbon conveying apparatus 401a may include a HEPA filter or other filtering device.

The support devices of the present disclosure can include a wide range of support surfaces for example substantially flat, concave, convex or other surface configurations. For instance, as shown in FIG. 3, the cutting support device 149 can optionally include the illustrated upwardly facing convex support surface 315 configured to support the bent target segment 151 over the cutting support device 149 with the cushion 307 of fluid.

The support devices of the disclosure can be designed to extend along the entire width of the glass ribbon 103 in a direction transverse to the axis 217. Alternatively, as shown in FIG. 2, a plurality of cutting support devices 149 may be aligned in a row along the width of the glass ribbon 103. Providing a plurality of support devices 149 can allow individual control of each cutting support device 149 along the width of the glass ribbon 103 to help tune in the desired transverse fluid cushion support profile to help accommodate different support requirements along the width of the glass ribbon 103.

Referring to FIG. 3, the cutting support device 149 can be provided with a plurality of passages 301 configured to provide positive pressure ports 303 such that a fluid stream 305 (e.g., air stream) can be forced through the positive pressure ports 303 toward the bent target segment 151 to create the fluid cushion 307 for supporting the bent target segment 151 with a noncontact support and/or a support with a controlled physical contact event. Optionally, the plurality of passages 301 can include negative pressure ports 309 such that a fluid stream 311 (e.g., air stream) can be drawn away from the bent target segment 151 to create a suction to partially counteract the force from the fluid cushion created by the positive pressure ports 303. A combination of positive and negative pressure ports can help stabilize the bent target segment 151 throughout the cutting procedure. Indeed, the positive pressure ports 303 can help maintain a desired fluid cushion 307 height between the central portion 205 of the glass ribbon 103 and the cutting support device 149. At the same time, the negative pressure ports 309 can help pull the glass ribbon toward the cutting support device 149 to prevent the glass ribbon 103 from undulating and/or prevent portions of the bent target segment 151 from floating away when traversing over the cutting support device 149 in the travel direction 112.

The glass ribbon conveying apparatus of the present disclosure further include one or more acoustic sensors configured to monitor a physical contact event between the glass ribbon and the support device by detecting an acoustic signal associated with the physical contact event. For example, FIG. 4 illustrates a first acoustic sensor "S1" that may be mounted to the cutting support device 149 to detect an acoustic signal 415 passing through the cutting support device 149. The first acoustic sensor "S1" can be mounted in a wide variety of locations. In some examples, the acoustic sensor can be strategically located in an attempt to avoid or control physical contact events. For instance, the acoustic sensor can be mounted in the vicinity of a typical location of a physical contact event for example the area of the dimple 323 associated with the coolant jet 317. In further examples, the acoustic sensor can be mounted in locations where physical contact events are important to process stability, for example locations near the glass feeding, conveyance, spooling or other locations.

As shown in the illustrated example, the first acoustic sensor "S1" can be mounted at a first end portion 403*a* although the first acoustic sensor "S1" may be mounted to a second end portion 403*b*, a lower portion, upper portion or any other location of the cutting support device 149. Furthermore, the first acoustic sensor "S1" may be provided alone or in combination with additional sensor(s). For instance, as shown in the illustrated example, the ribbon conveying apparatus 401*a* can further include an optional second acoustic sensor "S2" that may be mounted to the cutting support device 149 to likewise detect an acoustic signal passing through the cutting support device 149. The first and second acoustic sensors may be mounted, for example at opposite locations from one another. For instance, as shown in FIG. 4, the first acoustic sensor "S1" can be mounted to the first end portion 403*a* while the second acoustic sensor "S2" can be mounted to the second end portion 403*b* located opposite the first end portion 403*a*. Providing a plurality of sensors can help increase the chance of detecting physical contact events having a lower intensity since one of the sensors may be located closer to the physical contact event than the other sensor. In addition or alternatively, multiple acoustic sensors may help approximate the location of the physical contact event depending on the relative strengths of the signals received by the corresponding acoustic sensors.

As still further shown in FIGS. 3 and 4, in addition or alternative to the acoustic sensor(s) "S1", "S2", the ribbon conveying apparatus 401*a* may still further include an acoustic sensor "S3" configured to monitor the glass ribbon 103 to detect an acoustic signal 417 passing through the glass ribbon 103. For example, the acoustic sensor "S3" can comprise an optical laser vibrometer or interferometer to detect the acoustic wave 417 disturbance directly off the glass ribbon 103 itself.

As shown in FIG. 4, the ribbon conveying apparatus 401*a* can also include a controller 405 configured to modify operation of the glass ribbon conveying apparatus based on an acoustic signal detected by the acoustic sensor. The controller 405 can be provided in communication with the one or more sensors "S1", "S2", "S3" by way of respective communication lines "L1", "L2", "L3" although wireless communication may be possible in further examples. As such, the controller 405 may receive information from the sensors (e.g., by way of the communication lines) to determine a physical contact event and/or determining features of the physical contact event by analyzing the acoustic signal. The controller can further be placed in communication with other devices of the apparatus 101 to modify operation of the glass ribbon conveying apparatus. For instance, the controller 405 may be designed to modify the feed rate of the glass ribbon 103, the pressure being applied by the coolant jet 317 or other aspects of the apparatus. As shown in FIG. 4, the controller 405 can be placed in communication with a fluid manifold 407 that may be designed to control fluid flow through conduits 409*a* that may be placed in fluid communication with a positive pressure source 411*a* of fluid. In some examples, the fluid manifold 407 may also be designed to control fluid through optional second conduits 409*b* that may be placed in fluid communication with an optional negative pressure source 411*b*. As such, the fluid manifold may control the positive fluid streams 305 and/or the negative fluid streams 311 through the cutting support device 149. In some examples, the control 405 may operate the fluid manifold 407 to individually control the fluid streams (e.g., by individually operated valves) through the pressure ports 303, 309 to provide a desired pressure profile.

Still further, the ribbon conveying apparatus 401*a* can also include a storage device 413 configured to store process features of the apparatus 101, for example features of the conveying apparatus 401*a* associated with a time of the physical contact event. For example, the storage device 413 can store the air pressure within the positive pressure source 411*a*, the height of the air cushion 307, the pressure of the coolant jet 317, the feed rate of the glass ribbon or other process features. In some examples, the controller 405 may modify operation of the ribbon conveying apparatus based on stored process features within the storage device 413. For example, the information stored on the storage device 413 can be processed by algorithms to control the manifold 407 with the controller 405 to arrive at a desired pressure profile for the air cushion 307.

Methods of fabricating a glass ribbon with the apparatus 101 will now be described. As shown in FIG. 1, the method can include the step of traversing the glass ribbon 103 in a downward direction 121 relative to the source 105. As shown, the glass ribbon 103 can travel substantially vertically in the downward direction 121 although the downward direction may be angled in further examples wherein the glass ribbon 103 can travel at an inclined orientation in the downward direction. Although not shown, if the glass ribbon 103 is supplied on a spool for example 124, it may also traverse from the spool to the cutting unit in a substantially horizontal direction with little or no travel in the downward direction.

Figure 5:
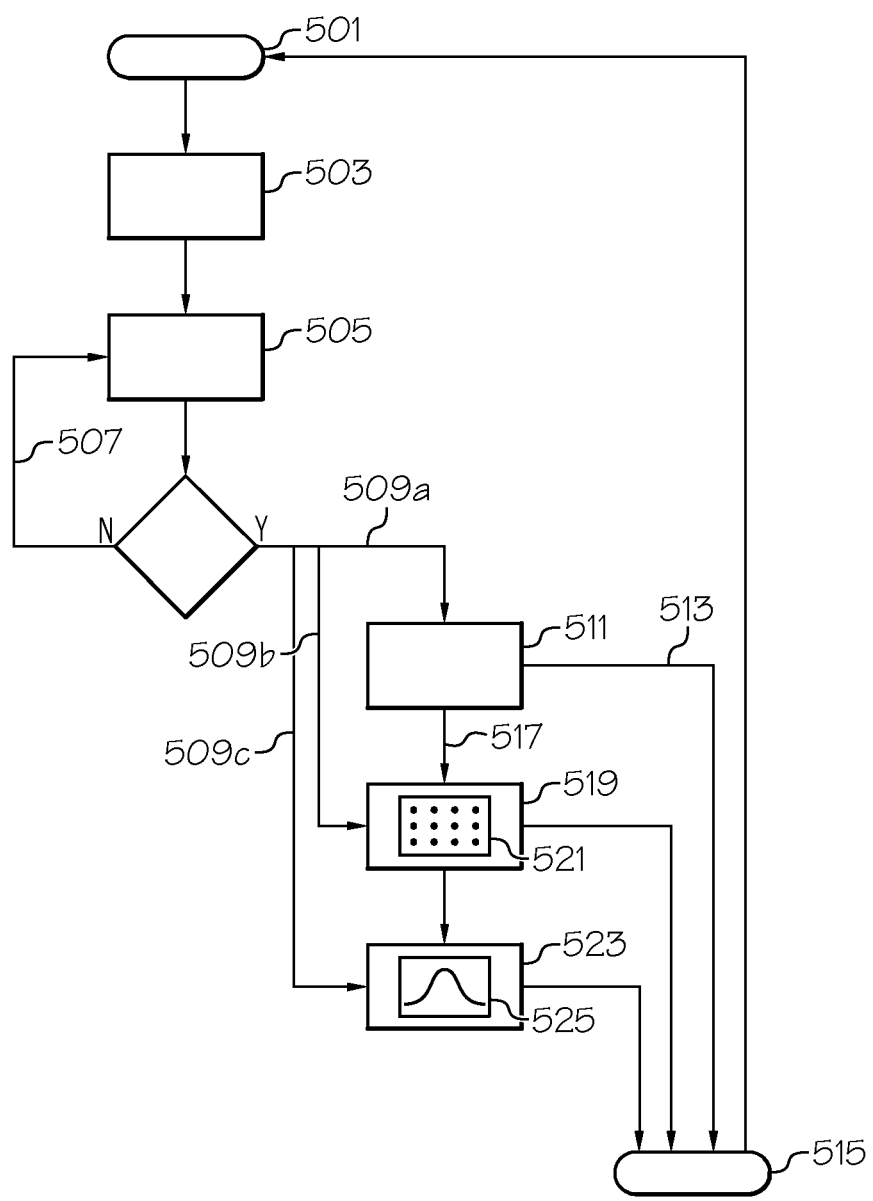
FIG. 5 is a flow chart illustrating example steps in a method of conveying a glass ribbon.

Turning to FIG. 5, the method can begin at start point 501 with the step 503 of conveying the glass ribbon 103 over a support device with a cushion of fluid, for example a cushion of air, supporting the glass ribbon over the support device. As mentioned previously, the support device can comprise a fluid bar configured to generate the cushion of fluid. In some examples, the fluid bar can comprise an air bar configured to generate a cushion of air. The method can convey the glass ribbon 103 over one or more support devices for example various fluid bars (e.g., air bars) that can comprise the bending support device 135, cutting support device 149, post-cutting support devices 188, 190, the edge portion support device 191 or other support devices.

The method can further include the step 505 of monitoring a physical contact event between the glass ribbon 103 and the support device by detecting an acoustic signal associated with the physical contact event. As shown in FIG. 4, in one example, the method can detect the acoustic signal as an acoustic signal 415 propagating through the support device. Indeed, as shown in FIG. 4, the contact event can generate an acoustic signal 415 that propagates through the cutting support device 149 and can be detected by the sensor(s) "S1" and/or "S2". As the contact event is closer to the first acoustic sensor "S1", the signal detected by this sensor may be stronger than the signal detected by the second acoustic sensor "S2". As such, it is possible that the location of the physical contact event may be determined based on the signal ratio between the first and second sensors. This information may be useful, for example, if the specific area of the glass ribbon is desired to be located for subsequent examination.

As further shown in FIG. 4, in another example, the method can detect the acoustic signal as an acoustic signal 417 propagating the glass ribbon. Indeed, as shown in FIG.

4, the contact event can generate an acoustic signal 417 that propagates through the glass ribbon 103 that can be directly detected by the sensor "S3."

Turning back to FIG. 5, if no physical contact event is detected, the process can loop back along path 507 to the step 505 of monitoring for a physical contact event. Otherwise, if a contact even is detected, the method can then proceed with a variety of example steps as indicated by path 509*a*, 509*b*, 509*c*. For instance, the method can proceed along path 509*a* to step 511 of determining features of the physical contact event by analyzing the acoustic signal detected during 505. For instance, the location of the signal, intensity or profile of the signal can be analyzed. In one example, the duration of the contact, intensity of the contact, force consistency of the contact or other features may be determined based on a signal analysis of information obtained from the sensors. As indicated by path 513, the method can then proceed to end point 515.

In another example, the method can proceed along path 517 from step 511 or may proceed along path 509*b* directly to step 519 of storing process features of the method of conveying the glass ribbon associated with a time of the physical contact event. For instance, the process features may be added to a database 521 of process features stored on the storage device 413 for future reference to enable improvement of the process in the future based on information obtained. For example, the process features can be features of the physical contact event determined during step 511. In another example, the process features can comprise operating conditions of the method of conveying or manufacturing the glass ribbon. For example, the process features can comprise the feed rate of the glass ribbon 103, the pressure being applied by the coolant jet 317, features associated with the cushion 307 for example the fluid pressure, cushion height or other features.

The method can then proceed to the end point 515 of the process or could proceed to step 523 of controlling the method of conveying the glass ribbon based on process features stored during step 519. For example, the controller 405 can enter information from the database 521 stored on the storage device 413 into various algorithms 525 for determining commands that the controller can send to various devices of the apparatus to control the method of conveying the glass ribbon. For instance, step 523 can control the manifold 407 to modify the characteristics of the cushion 307 of fluid to modify future contact events.

Methods of the present disclosure can therefore modify the method of conveying the glass ribbon with feedback from the detected acoustic signal. In one example, the method can include the step of severing the glass ribbon. As shown in FIG. 3, the force of the coolant jet 317 may be sufficient to counteract the bias provided by the bending support device 135 such that localized deformation may form that may, as shown, cause a physical contact event located at a physical contact interface 321 wherein the protuberance 325 of the glass ribbon 103 physically contacts the bending support device 135 at the physical contact interface 321. As shown, the localized deformation can result in a dimple 323 in the outwardly facing surface 139 of the glass ribbon 103 and a corresponding opposite protuberance 325 in the downwardly facing surface 141 of the glass ribbon 103. As such, the physical contact event of detected during step 505 comprises a touch down event of the glass ribbon physically contacting the support device during the step of severing the glass ribbon. The method can then proceed through one or more of steps 511 and 519 to step 523 of modifying the method of conveying the glass ribbon with feedback from the detected acoustic signal. In one example, the step 523 modifies the method of conveying the glass ribbon to provide a more consistent touch down event during a subsequent step of severing the glass ribbon. For instance, if the contact event is acceptable, the consistency of the force applied during the contact event can be controlled, for example, to avoid undue fluctuations in the glass contact force. Moreover, step 523 can also modify the method of conveying the glass ribbon to provide a more stable touch down event during a subsequent step of severing the glass ribbon. In one example, the step 523 can help avoid jumping of the protuberance on the cutting support device 149. As such, impact damage may be avoided by inhibiting jumping of the protuberance to provide a more consistent and stable touch down event.

Still further, the method can be designed to obtain feedback to avoid future contact events. For instance, contact may be avoided by step 523. Indeed, based on information obtained during the contact event, devices of the apparatus may be adjusted to avoid future contact events.

As set forth above, the present disclosure provides conveying apparatus that each includes an acoustic sensor and methods that each include detecting an acoustic signal associated with a physical contact between the glass ribbon and a support device. The acoustic sensors and methods of detecting acoustic signals can provide a low cost and effective way of detecting, locating and assessing the touchdown of glass ribbon being supported on a cushion of fluid over a support device. Such physical contact events can be monitored during glass feeding, cutting, conveying and spooling during a glass manufacturing process. The physical contact event can be attributed to multiple factors for example laser thermal deformation, dimple form air nozzle pressure, or residual stress or warp during formation. The physical contact event can be continuous or intermittent, and located and assessed to aid process tuning. For example, the location of physical contact events may be determined. In another example, the intensity of the physical contact can be determined. The process parameters may then be adjusted for feed rate and/or glass thickness to avoid touchdown events. In addition, touchdown events can be detected and the process can be modified to avoid future touchdown events that may otherwise damage the glass ribbon. Avoiding future contact events may be particularly important to increase the feed rate, process glass ribbon with reduced thickness, avoid instability in the process when spooling or cutting the glass ribbon and the like.

The disclosed methods and apparatus based on acoustic detection offers a low-cost, compact, reliable and robust solution that can be easily expended to cover the various procedures in the overall process of fabricating the glass ribbon, e.g., from glass feeding, laser cutting, conveying and spooling. The method can detect the sliding friction of the physical contact event between the moving glass ribbon and the underlying support device. The acoustic detection techniques takes advantage of the acoustic waveguide effect in that acoustic waves can propagate long distances through the support device as well as the glass ribbon that both can act as acoustic waveguides. As a result, one acoustic sensor can cover a relatively large area for touchdown detection. Multiple compact acoustic sensors can also be easily mounted to the process devices to provide a sensing network to cover the entire or large portions of the manufacturing process and/or can act to help location, for example, by triangulation techniques the exact location of the touchdown event.

In addition, the present disclosure of acoustic monitoring can allow physical contact events to be simultaneously monitored and recorded along with manufacturing process parameters of glass thickness, sheet velocity, air bearing and air nozzle pressure, glass vibration, laser power, for example, for process diagnostics and tuning.

It will be apparent to those skilled in the art that various modifications and variations can be made without departing from the spirit and scope of the claimed invention.

What is claimed is:

1. A method of conveying a glass ribbon comprising the steps of:
   (I) conveying the glass ribbon over a support device with a cushion of fluid supporting the glass ribbon over the support device;
   (II) monitoring a physical contact event between the glass ribbon and the support device by detecting an acoustic signal associated with the physical contact event; and
   (III) severing the glass ribbon, wherein the physical contact event of step (II) comprises a touch down event of the glass ribbon physically contacting the support device during the step of severing the glass ribbon.

2. The method of claim 1, wherein after step (II), further comprising the step (III) of modifying the method of conveying the glass ribbon with feedback from the detected acoustic signal.

3. The method of claim 1, further comprising modifying the method of conveying the glass ribbon to provide a more consistent touch down event during a subsequent step of severing the glass ribbon.

4. The method of claim 1, further comprising modifying the method of conveying the glass ribbon to provide a more stable touch down event during a subsequent step of severing the glass ribbon.

5. The method of claim 1, wherein step (II) detects the acoustic signal as an acoustic signal propagating through the glass ribbon or through the support device.

6. The method of claim 1, further comprising the step (III) of storing process features of the method of conveying the glass ribbon associated with a time of the physical contact event.

7. The method of claim 6, further comprising the step (IV) of controlling the method of conveying the glass ribbon based on process features stored during step (III).

8. The method of claim 1, further comprising the step of determining features of the physical contact event by analyzing the acoustic signal detected during step (II).

9. The method of claim 1, wherein the step of severing the glass ribbon includes applying a coolant jet to the glass ribbon, wherein the coolant jet causes the physical contact of the glass ribbon with the support device during the physical contact event.

10. A method of conveying a glass ribbon comprising the steps of:
    (I) conveying the glass ribbon over a support device with a cushion of fluid supporting the glass ribbon over the support device;
    (II) physically contacting the glass ribbon with the support device during a physical contact event, wherein physically contacting the glass ribbon with the support device causes an acoustic signal to propagate through at least one of the glass ribbon and the support device;
    (III) monitoring the physical contact event by detecting the acoustic signal propagating through the at least one of the glass ribbon and the support device; and
    (IV) severing the glass ribbon, wherein the physical contact event of step (II) comprises a touch down event of the glass ribbon physically contacting the support device during the step of severing the glass ribbon.

11. The method of claim 10, wherein after step (III), further comprising the step (IV) of modifying the method of conveying the glass ribbon with feedback from the detected acoustic signal.

12. The method of claim 10, wherein the step of severing the glass ribbon includes applying a coolant jet to the glass ribbon, wherein the coolant jet causes the physical contact of the glass ribbon with the support device during the physical contact event.

13. The method of claim 10, further comprising modifying the method of conveying the glass ribbon to provide a more consistent touch down event during a subsequent step of severing the glass ribbon.

14. The method of claim 10, further comprising modifying the method of conveying the glass ribbon to provide a more stable touch down event during a subsequent step of severing the glass ribbon.

15. The method of claim 10, further comprising the step (IV) of storing process features of the method of conveying the glass ribbon associated with a time of the physical contact event.

16. The method of claim 15, further comprising the step (V) of controlling the method of conveying the glass ribbon based on process features stored during step (IV).

17. The method of claim 10, further comprising the step of determining features of the physical contact event by analyzing the acoustic signal detected during step (III).

* * * * *